(12) United States Patent
Howard et al.

(10) Patent No.: US 11,870,267 B2
(45) Date of Patent: Jan. 9, 2024

(54) SYSTEM AND METHOD FOR CONSTRAINING GRID-INDUCED POWER DEVIATIONS FROM GRID-FORMING INVERTER-BASED RESOURCES

(71) Applicant: General Electric Company, Schenectady, NY (US)

(72) Inventors: Dustin Howard, Brookhaven, GA (US); Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 17/536,205

(22) Filed: Nov. 29, 2021

(65) Prior Publication Data

US 2023/0170704 A1    Jun. 1, 2023

(51) Int. Cl.
*H02J 3/00* (2006.01)
*H02J 3/46* (2006.01)

(52) U.S. Cl.
CPC .............. *H02J 3/46* (2013.01); *H02J 2300/28* (2020.01)

(58) Field of Classification Search
CPC ........... H02J 3/381; H02J 3/46; H02J 2300/28
See application file for complete search history.

(56) References Cited

U.S. PATENT DOCUMENTS

| | | |
|---|---|---|
| 5,327,335 A | 7/1994 | Maddali et al. |
| 5,798,631 A | 8/1998 | Spee et al. |
| 5,798,633 A | 8/1998 | Larsen et al. |
| 6,472,775 B1 * | 10/2002 | Huang .............. H02M 7/53875 307/105 |
| 7,119,452 B2 | 10/2006 | Larser |

(Continued)

FOREIGN PATENT DOCUMENTS

| | | |
|---|---|---|
| CN | 109494709 A | 3/2019 |
| EP | 2523298 B1 | 11/2012 |

(Continued)

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

(Continued)

*Primary Examiner* — Julio C. Gonzalez
(74) *Attorney, Agent, or Firm* — Dority & Manning, P.A.

(57) ABSTRACT

A method for providing grid-forming control of an inverter-based resource includes receiving, via a controller, a power reference signal. The method also includes determining a dynamic power change limit. Further, the method includes determining, via the controller, an upper power boundary and a lower power boundary for grid-induced power deviations from a desired power operating point based on the power reference signal. Moreover, the method includes determining, via the controller, limits for an inertial power regulator reference based, at least in part, on the upper and lower power boundaries and the dynamic power change limit. In addition, the method includes applying, via the controller, the limits to the inertial power regulator reference in an inertial power regulator of the inverter-based resource.

18 Claims, 12 Drawing Sheets

(56) References Cited

U.S. PATENT DOCUMENTS

| | | |
|---|---|---|
| 7,411,309 B2 | 8/2008 | Hudson |
| 7,425,771 B2 | 9/2008 | Rivas et al. |
| 7,456,695 B2 | 11/2008 | Weng et al. |
| 7,804,184 B2 | 9/2010 | Yuan et al. |
| 8,008,793 B2 | 8/2011 | Andresen |
| 8,013,461 B2 | 9/2011 | Delmerico et al. |
| 8,097,971 B2 | 1/2012 | Ichinose et al. |
| 8,310,074 B2 | 11/2012 | Larsen et al. |
| 8,780,595 B2 * | 7/2014 | Larsen ............... H02J 3/1842 363/39 |
| 9,270,194 B2 * | 2/2016 | Brogan ............... H02M 5/4585 |
| 9,660,452 B2 | 5/2017 | Routimo |
| 9,660,453 B2 | 5/2017 | Majumder |
| 10,156,225 B2 | 12/2018 | Huang et al. |
| 2007/0216164 A1 | 9/2007 | Rivas et al. |
| 2009/0121482 A1 | 5/2009 | Rickard |
| 2009/0167095 A1 | 7/2009 | Rivas et al. |
| 2009/0200803 A1 | 8/2009 | Ichinose et al. |
| 2009/0278351 A1 | 11/2009 | Rivas et al. |
| 2010/0142237 A1 | 6/2010 | Yuan et al. |

FOREIGN PATENT DOCUMENTS

| | | |
|---|---|---|
| WO | WO2015131958 A1 | 9/2015 |
| WO | WO 2021/145877 A1 | 7/2021 |

OTHER PUBLICATIONS

The EP Search Report for EP application No. 22208368.5, dated Mar. 30, 2023, 9 pages.

Tessaro, Heitor Jose et al., Impact Assessment of Virtual Synchronous Generator on the Electromechanical Dynamics of Type 4 Wind Turbine Generators, IET Generation, Transmission & Distribution, IET, UK, vol. 13, No. 23, Nov. 7, 2019, pp. 5294-5304.

* cited by examiner

SYSTEM AND METHOD FOR CONSTRAINING GRID-INDUCED POWER DEVIATIONS FROM GRID-FORMING INVERTER-BASED RESOURCES

FIELD

The present disclosure relates generally to inverter-based resources, such as wind turbine power systems and, more particularly, to systems and methods for constraining grid-induced power deviations from grid-forming inverter-based resources.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv. The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2. The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control according to conventional construction is illustrated. As shown, a converter controller 1 receives references (e.g., Vref and Pref) and limits (e.g., VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g., VcnvCmd) and angle (e.g., $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

To be effective, grid-forming (GFM) inverter-based resources (IBRs) must be able to maintain an internal voltage phasor that does not move quickly when there are changes in grid conditions, e.g., sudden addition/removal of loads, opening or closing of grid connections that lead to phase jumps and/or rapid change of frequency. In other words, the power from the grid-forming resource must be able to change suddenly to stabilize the grid, with a subsequent slow reset to power being commanded from a higher-level control function. In addition, the grid-forming resource must be able to rapidly enforce power limits that exist due to constraints on the power-handling portions of the device, e.g., DC voltages/currents in a battery, solar array, and/or wind generating system. Such a response is needed for severe disturbances on the grid, e.g., faults where power limits will be dynamically adjusted to coordinate with grid conditions for secure recovery from the fault. Further, the grid-forming resource should be able to rapidly follow changes in commands from higher-level controls, e.g., for damping mechanical vibrations in a wind turbine. Such requirements, however, can be difficult to achieve.

GFM controls for IBRs are typically achieved through modification of a voltage magnitude, frequency, and angle. One characteristic of GFM controls is a slow response in the controlled voltage frequency and angle in response to grid events. The controls are designed this way to provide a synthetic inertia and synchronizing torque characteristic similar to the physical characteristics of synchronous machines. However, a consequence of this control design is that slow changing internal frequency and phase of the GFM IBR relative to rapidly changing grid conditions may lead to undesirable oscillations in the active power output of the resource during and after grid events. Additionally, the grid may extract a level of power out of the GFM IBR that exceeds its design rating during these events.

Thus, a consequence of this control feature is that rapid changes in electrical frequency and phase of the grid (due to various grid faults/disturbances) cause rapid changes in power output. This aspect of grid-forming IBR control is desirable for the stability of the grid frequency. However, if the grid-induced power changes are too large, trips, equipment overloads, or instabilities can occur.

In view of the foregoing, an improved system and method that addresses the aforementioned issues would be welcomed in the art. Accordingly, the present disclosure is directed to systems and methods for constraining grid-induced power deviations from GFM IBR to facilitate better control of the power output during severe grid events. In particular, the present disclosure is directed to systems and methods for constraining the beneficial inertial effects of the GFM IBR within power boundaries to avoid undesirable equipment overloads, trips, or instabilities.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of an inverter-based resource. The method includes receiving, via a controller, a power reference signal. The method also includes determining, via the controller, an upper power boundary and a lower power boundary based on the power reference signal. Further, the method includes determining, via the controller, a dynamic power change limit for grid-induced power deviations from a desired power operating point. Moreover, the method includes determining, via the controller, limits for an inertial power regulator reference based, at least in part, on the upper and lower power boundaries and the dynamic power change limit. In addition, the method includes applying, via the controller, the limits to the inertial power regulator reference in an inertial power regulator of the inverter-based resource. It should be understood that the method may further include any of the additional features and/or steps described herein.

In another aspect, the present disclosure is directed to a converter controller for providing grid-forming control of an inverter-based resource connected to an electrical grid. The converter controller includes at least one controller having at least one processor. The processor(s) is configured to perform a plurality of operations, including but not limited to receiving a power reference signal, determining a dynamic power change limit, determining an upper power boundary and a lower power boundary for grid-induced power deviations from a desired power operating point based, at least in part, on the power reference signal, determining limits for an inertial power regulator reference based, at least in part, on the upper and lower power boundaries and dynamic power change limit, and applying the limits to the inertial power regulator reference in an inertial power regulator of the inverter-based resource. It should be understood that the converter controller may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
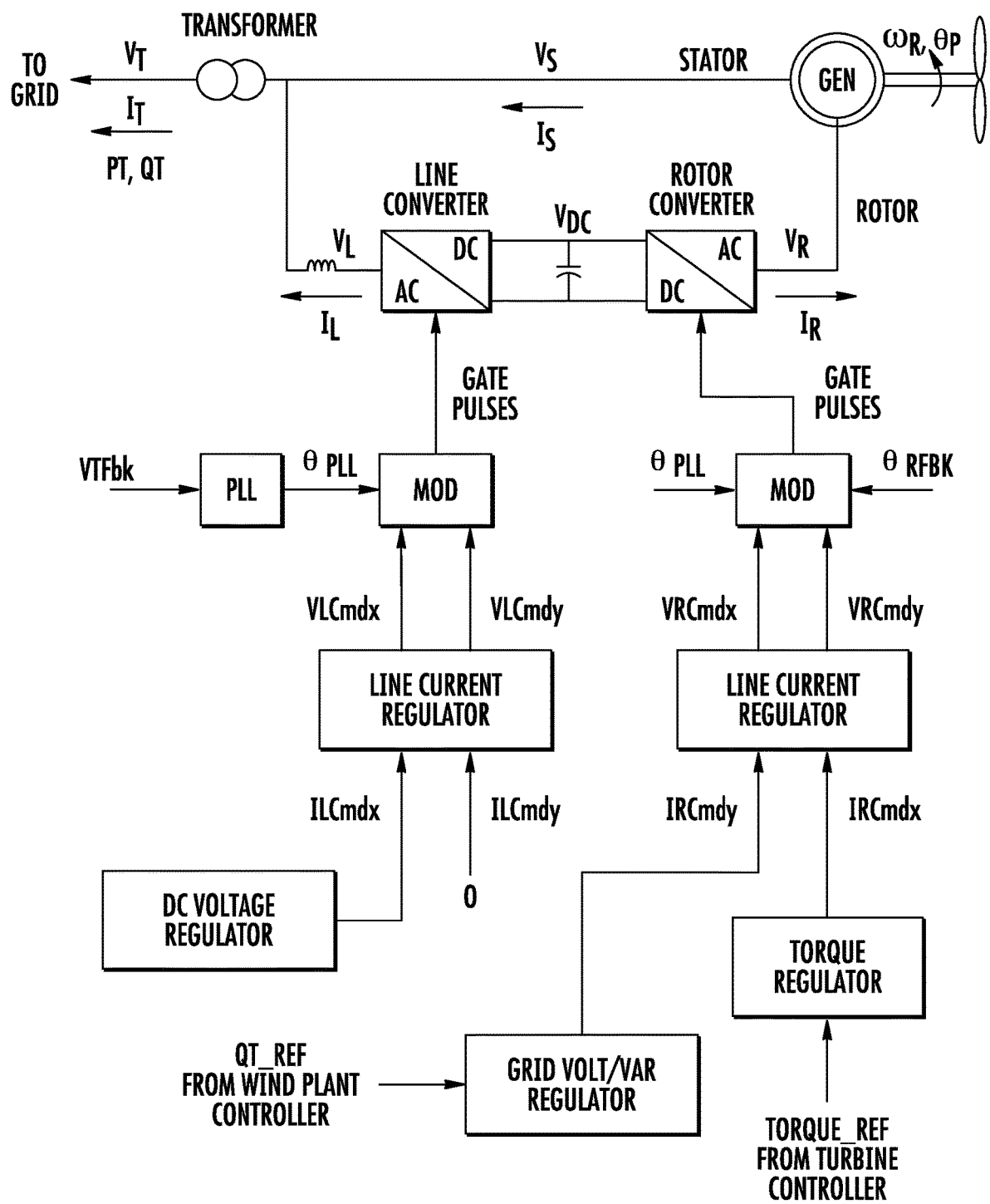
FIG. 1 illustrates a one-line diagram of a double-fed wind turbine generator with structure of converter controls for grid-following application according to conventional construction.
Figure 2:
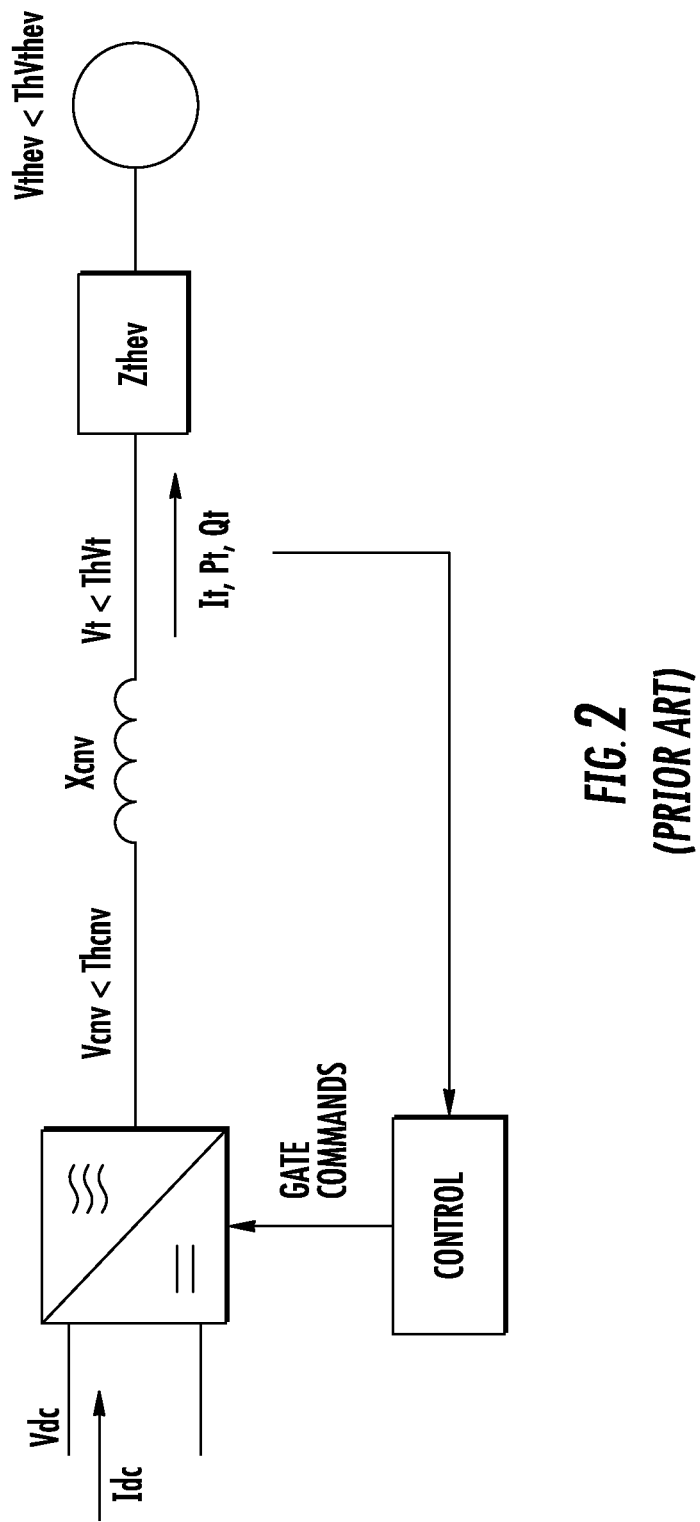
FIG. 2 illustrates a schematic diagram of one embodiment of a main circuit of a grid-forming system according to conventional construction.
Figure 3:
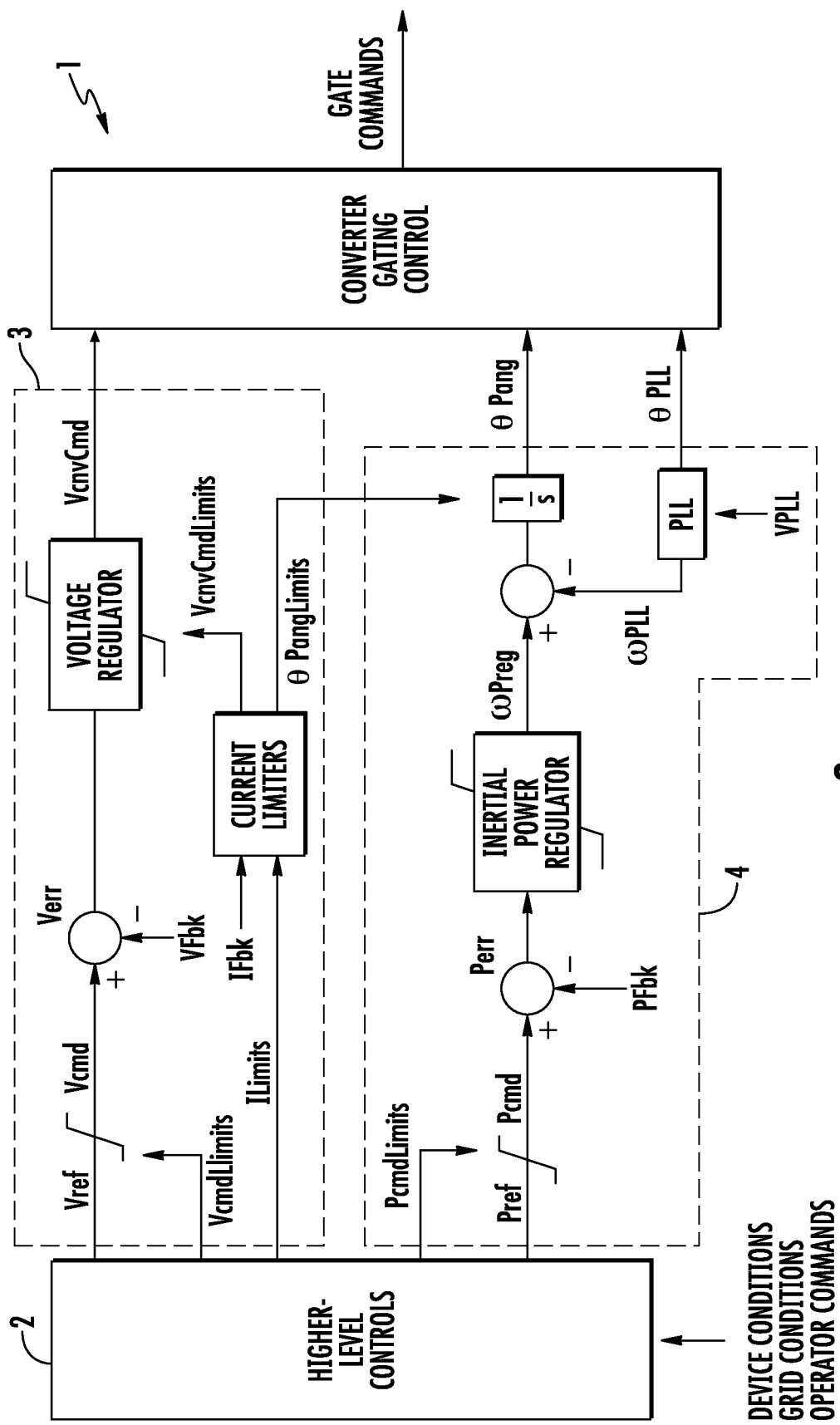
FIG. 3 illustrates a control diagram for providing grid-forming control according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Grid-forming inverter-based resources (GFM IBR) have control functions that emulate the physical aspects of synchronous machines, including an inertial power regulator. A consequence of this control feature is that rapid changes in electrical frequency and phase of the grid (due to various grid faults/disturbances) cause rapid changes in power output. This aspect of GFM IBR is desirable for the stability of the grid frequency. However, if the grid-induced power changes are too large, trips, equipment overloads, or instabilities can occur. Thus, the present disclosure is generally directed to systems and methods for providing grid-forming control via an inverter-based resource that address the aforementioned issues. In particular, systems and methods of the present disclosure include constraining the beneficial inertial effects of the GFM IBR within power boundaries to avoid undesirable equipment overloads, trips, or instabilities.

Figure 4:
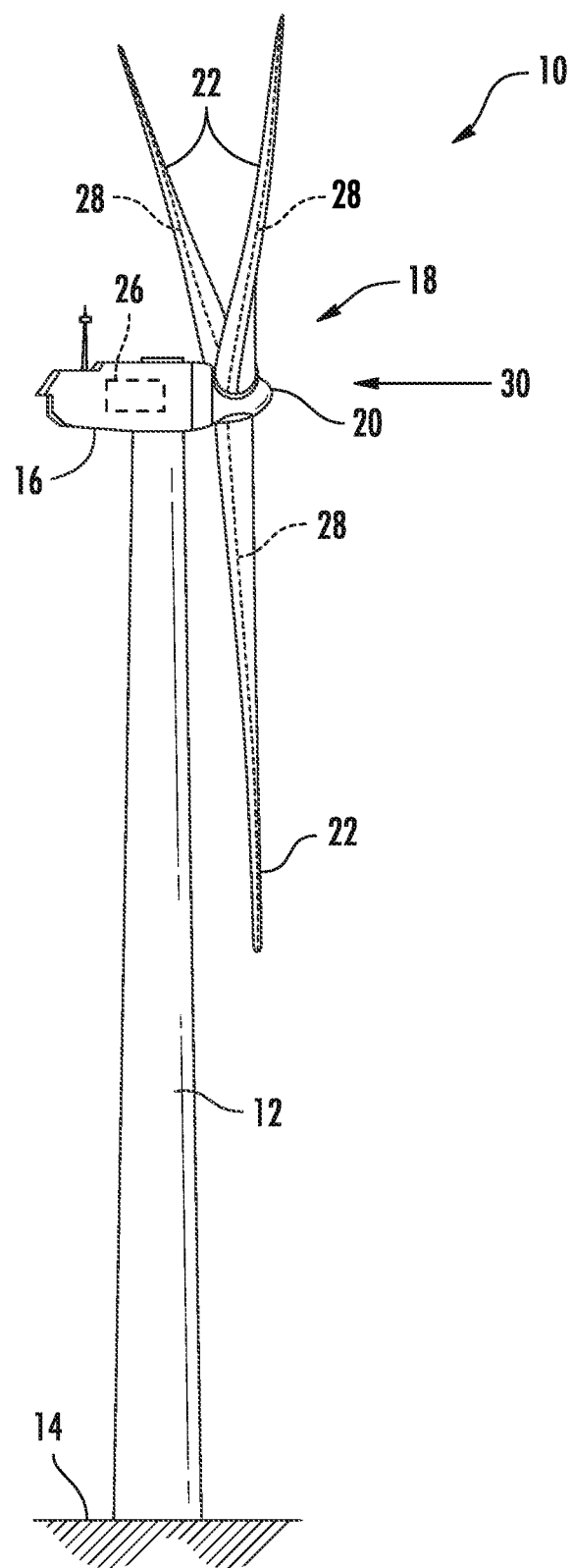
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 5:
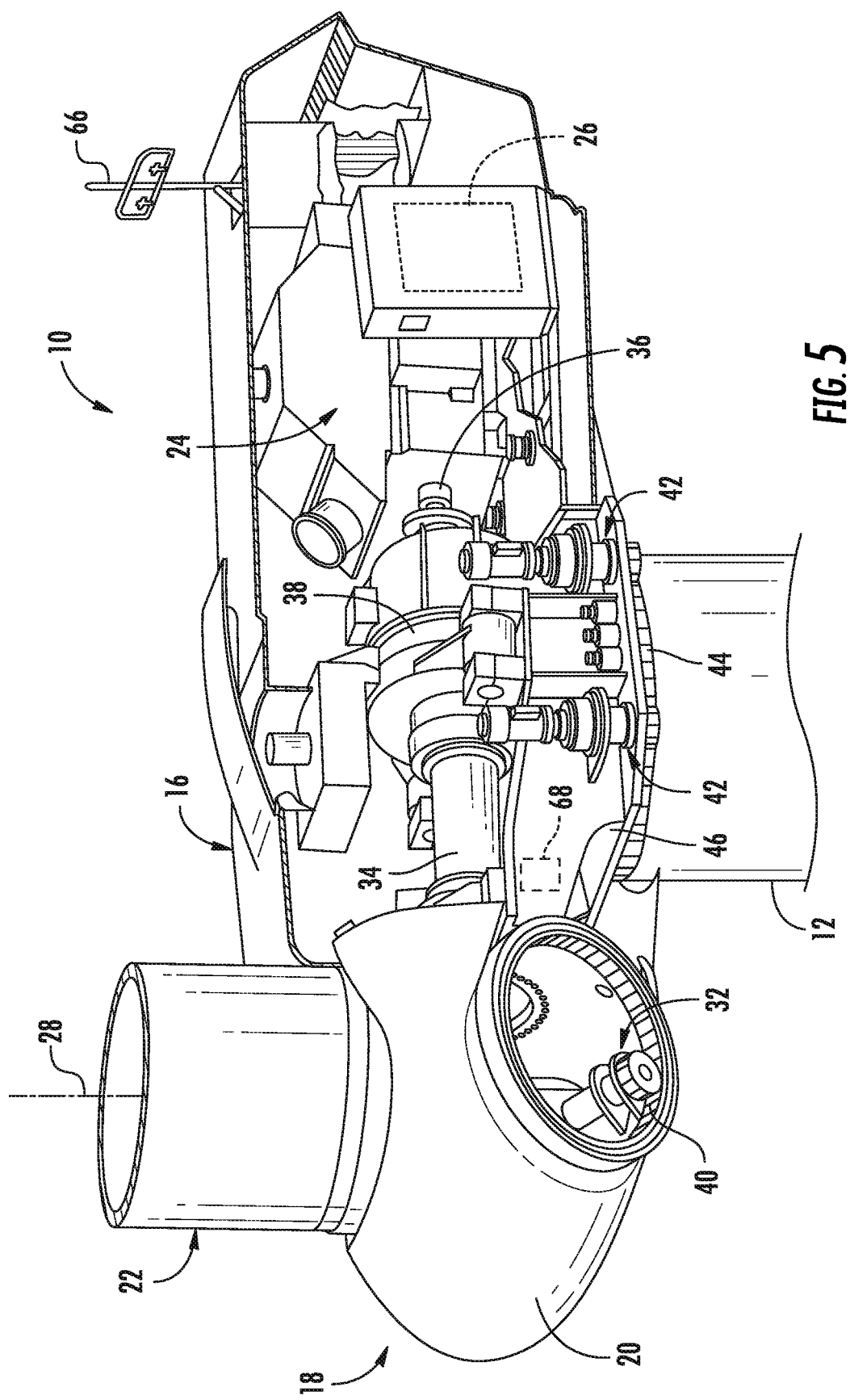
FIG. 5 illustrates a simplified, internal view of one embodiment of a nacelle according to the present disclosure.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 6:
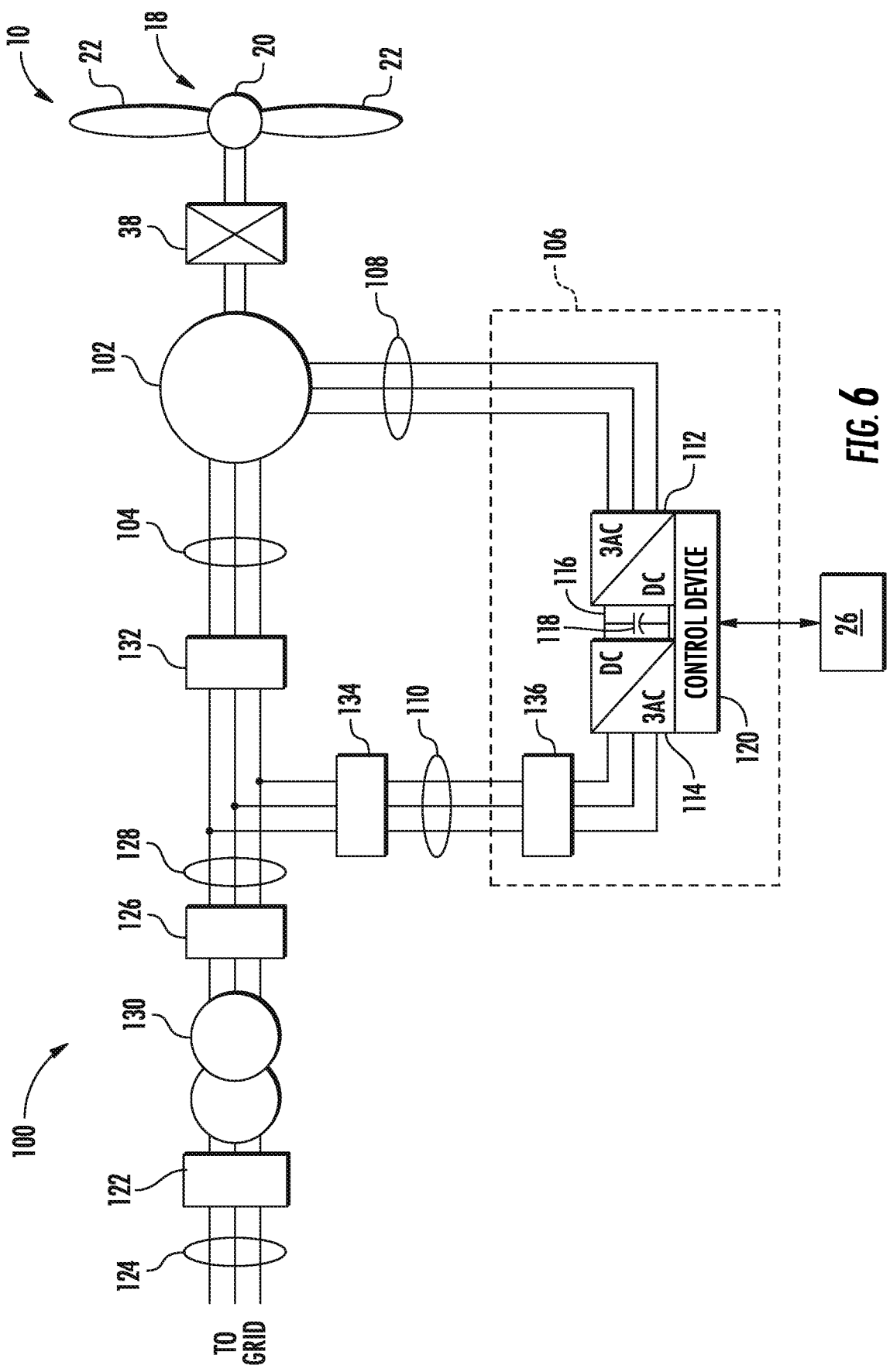
FIG. 6 illustrates a schematic view of one embodiment of a wind turbine electrical power system suitable for use with the wind turbine shown in FIG. 1.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the turbine controller 26 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 7:
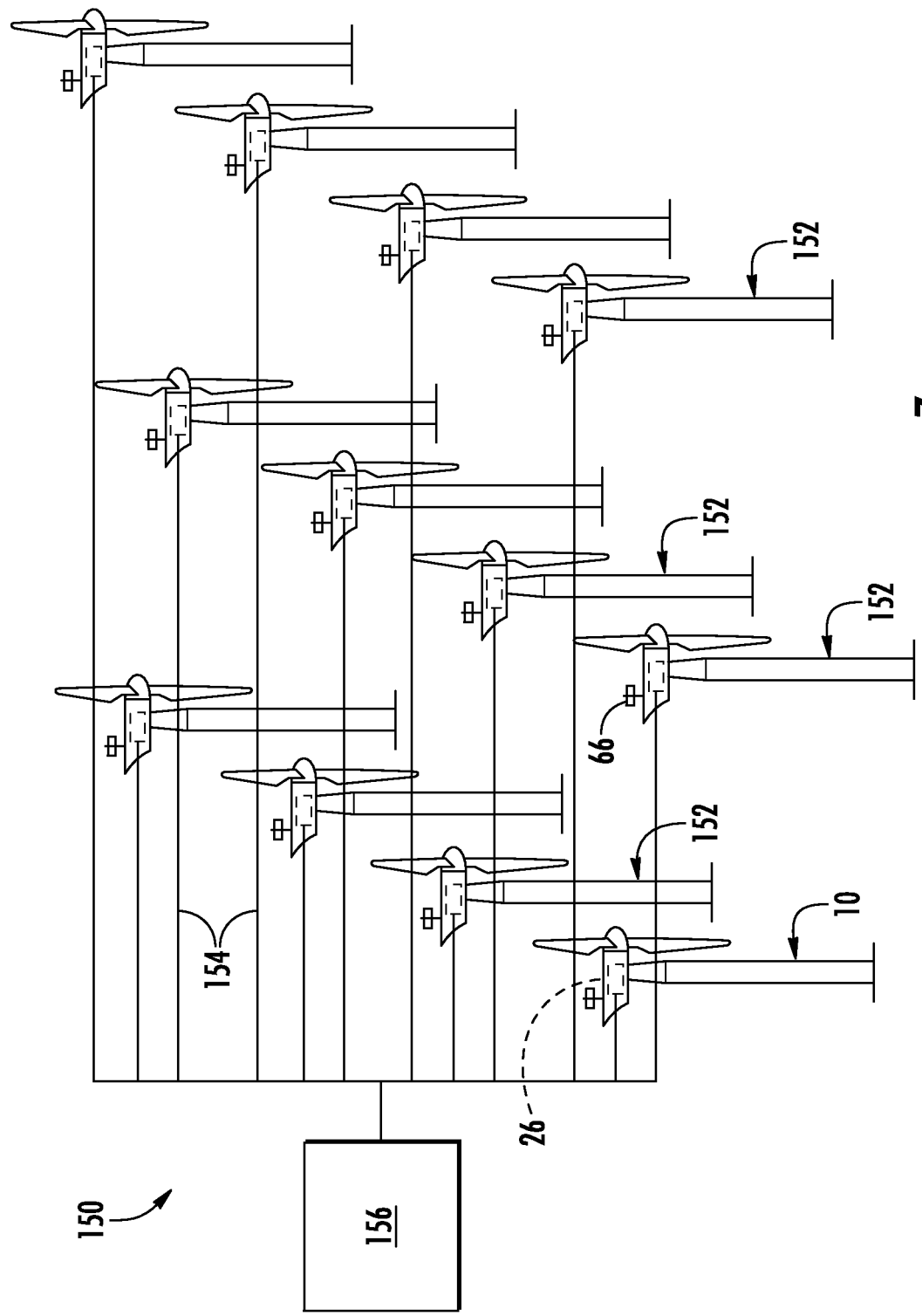
FIG. 7 illustrates a schematic view of one embodiment of a wind farm having a plurality of wind turbines according to the present disclosure.

Referring now to FIG. 7, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g., through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 8:
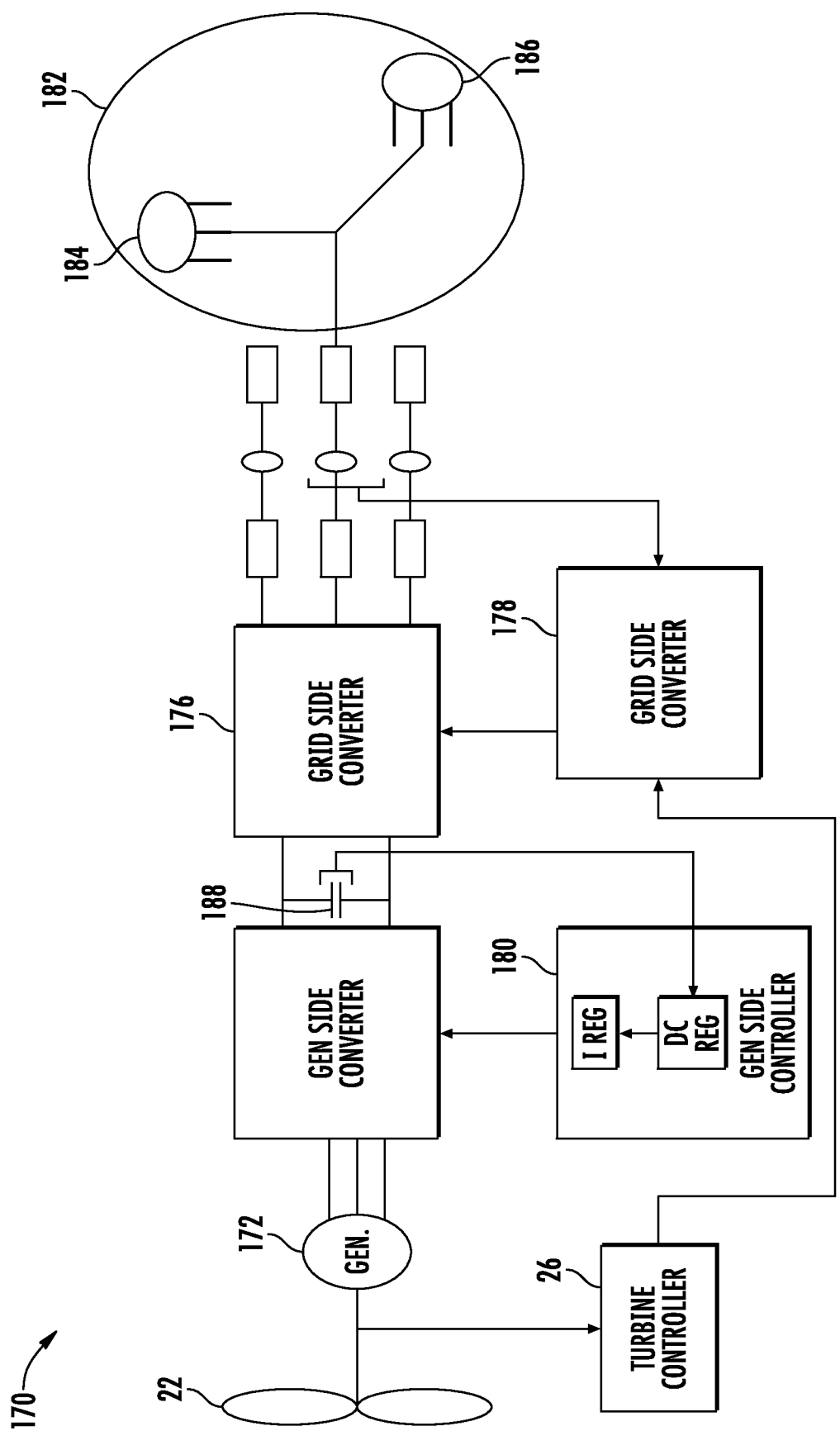
FIG. 8 illustrates a schematic view of another embodiment of a wind turbine electrical power system suitable for use with the wind turbine shown in FIG. 1.

Referring now to FIG. 8, a schematic diagram of another embodiment of a wind turbine power system 170 is illustrated in accordance with aspects of the present disclosure. In contrast to FIG. 6, however, the wind turbine power system 170 of FIG. 7 is a full-conversion system. In particular, as shown, the wind turbine power system 100 includes a generator 172, a generator side converter 174, and a grid side converter 176. The wind turbine power system 170 further includes a grid side controller 178, a generator side controller 180, and a power grid 182. The power grid 182 typically includes traditional synchronous generators 184 and electrical loads 186. A direct current (DC) link 188 connects the generator side converter 174 and the grid side converter 176. The generator side converter 174 converts alternating current (AC) power generated by the generator 172 into DC power. The grid side converter 176 then converts the DC power to AC power at a frequency compatible with the power grid 182. Thus, in an embodiment, the combination of the grid side controller 178 and grid side converter 176 functions as a current source for the power grid 182. In other words, the grid side controller 178 controls the phase and amplitude of the output current 30 of grid side converter 176.

Figure 9:
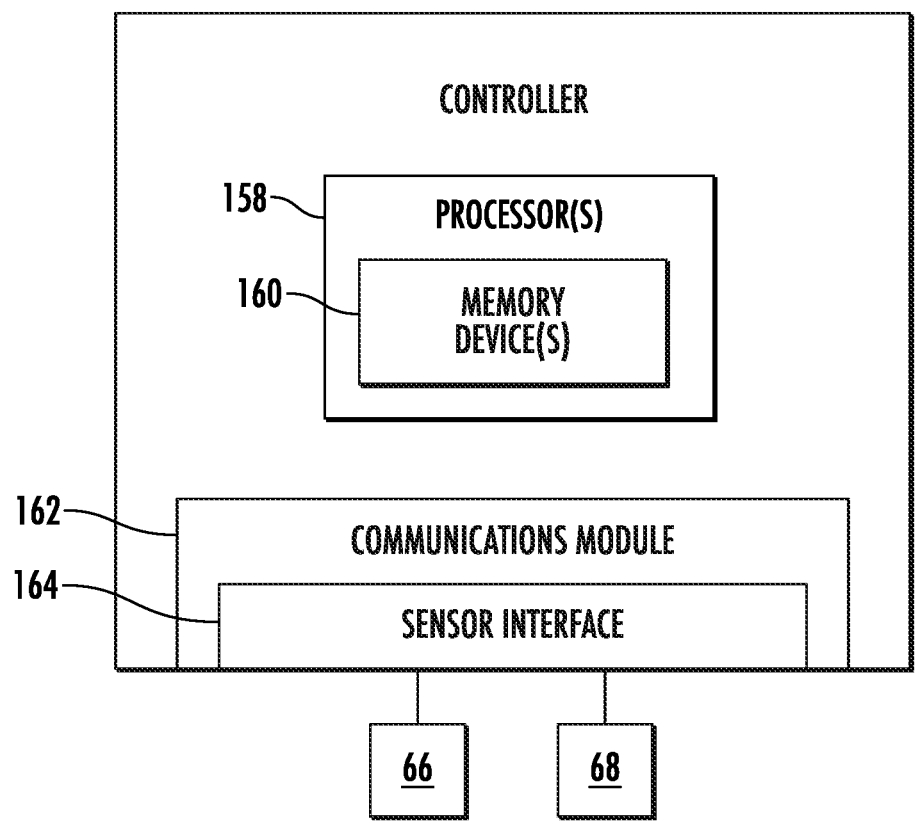
FIG. 9 illustrates a block diagram of one embodiment of a controller according to the present disclosure.

Referring now to FIG. 9, a block diagram of one embodiment of suitable components that may be included within the controller (such as any one of the converter controller 120, the turbine controller 26, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 158.

Figure 10:
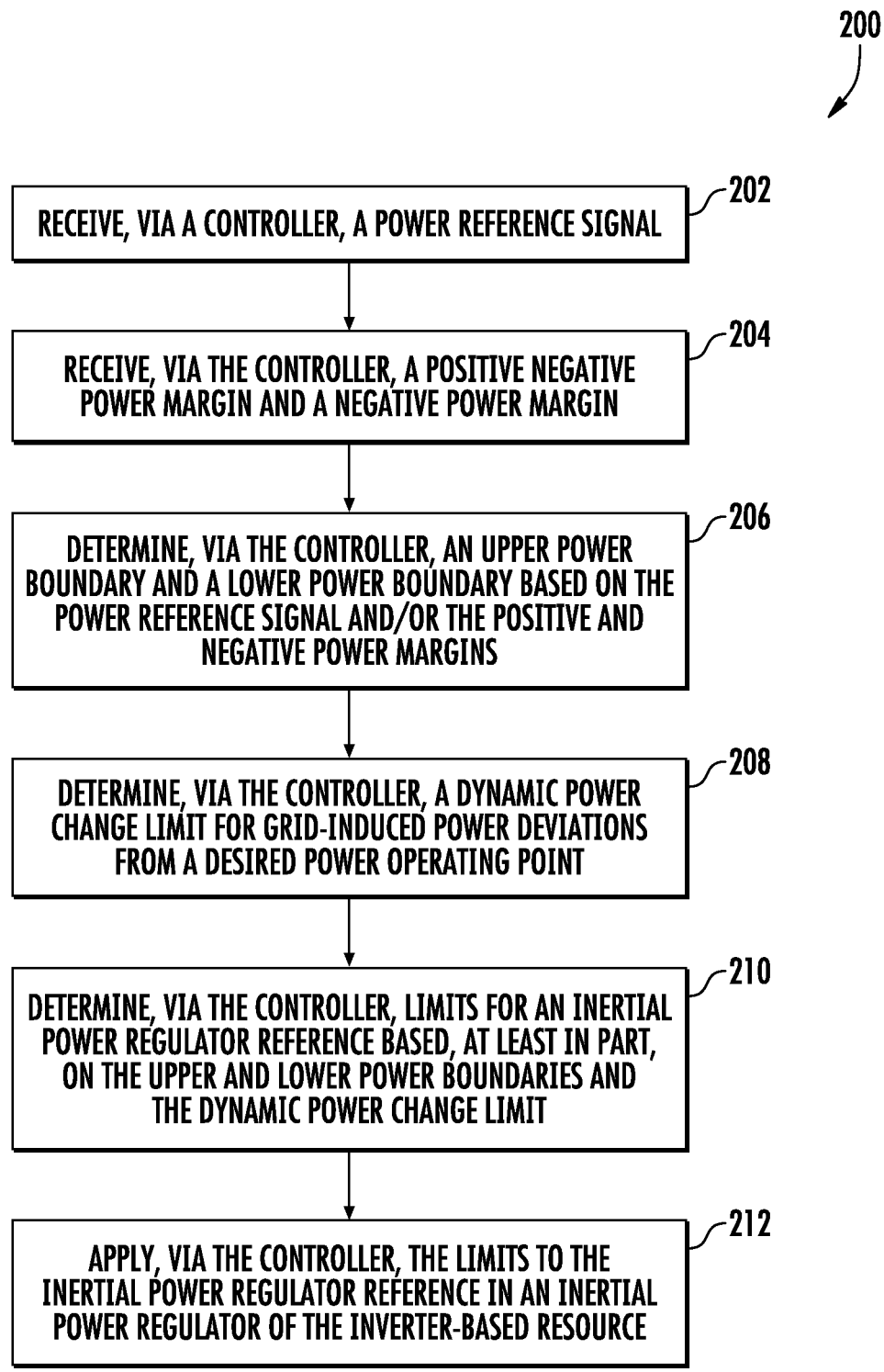
FIG. 10 illustrates a flow diagram of one embodiment of a method for providing grid-forming control of an inverter-based resource according to the present disclosure.

Referring now to FIG. 10, a flow diagram of one embodiment of a method 200 for providing grid-forming control of an inverter-based resource is provided. In general, the method 200 is described herein with reference to the wind turbine power system 100 of FIGS. 4-9. However, it should be appreciated that the disclosed method 200 may be implemented with any other suitable power generation systems having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving, via a controller, a power reference signal. As shown at (204), the method 200 optionally includes receiving, via the controller, a positive negative power margin and a negative power margin. As shown at (206), the method 200 includes determining, via the controller, an upper power boundary and a lower power boundary based on the power reference signal and/or the positive and negative power margins. As shown at (208), the method 200 includes determining a dynamic power change limit for grid-induced power deviations from a desired operating point. As shown at (210), the method 200 includes determining, via the controller, limits for an inertial power regulator reference based, at least in part, on the upper and lower power boundaries and the dynamic power change limit. As shown at (210), the method 200 includes applying, via the controller, the limits to the inertial power regulator reference in an inertial power regulator of the inverter-based resource.

Figure 11:
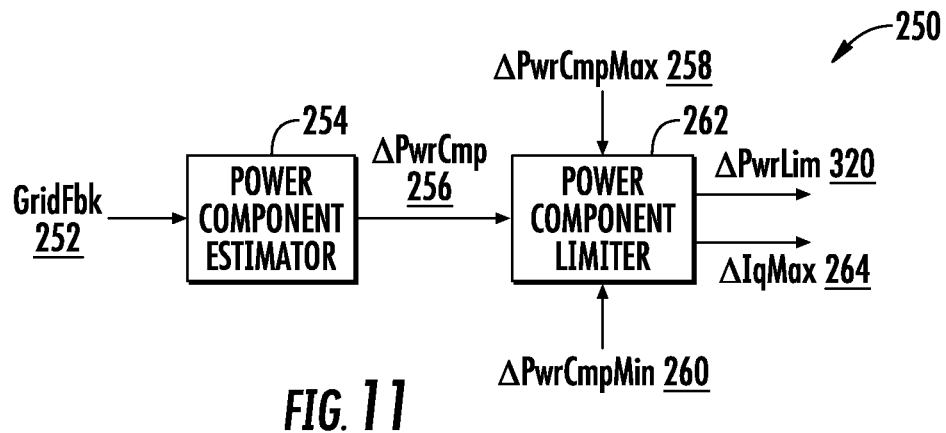
FIG. 11 illustrates a control diagram of one embodiment of a system for estimating a certain component of power for providing grid-forming control of an inverter-based resource according to the present disclosure.

Furthermore, the method 200 of FIG. 10 can be better understood with reference to FIGS. 11-16. More specifically, as shown in FIG. 11, a control diagram 250 of an embodiment for estimating a certain component of power for providing grid-forming control of an inverter-based resource according to the present disclosure is illustrated. Thus, as shown, the control diagram 250 includes receiving a grid feedback signal 252 and using a power component estimator 254 to estimate a change in a power component 256 (ΔPwrCmp). In such embodiments, the power component 256 may be, for example, a power component associated with a grid phase jump ("phase jump power") or a power component associated with a grid frequency drift ("inertial power"). Further, as shown, a power component limiter 262 is configured to receive the change in the power component 256, a maximum component limit 258, and a minimum component limit 260 to calculate a dynamic power change limit 320 (ΔPwrLim) and a dynamic reactive current change limit 264 (ΔIqMax).

In an embodiment, an estimate of a power component associated with a phase jump may be determined by a combination of a phase error signal of a phase-locked loop (PLL) and an estimate of the reactance of the system. This reactance may include both the reactance of the grid-forming resource and an estimated reactance of the grid. Moreover, in an embodiment, an estimate of the power component associated with a frequency change may be determined using a frequency feedback determined from a PLL together with the dynamic equations of a virtual synchronous machine being emulated by the grid-forming resource. These dynamic equations may have parameters associated with virtual inertia, damping, and/or an estimate of the system reactance. The PLL frequency feedback used to calculate power components associated with inertial power may be limited, rate limited, or filtered to remove high frequency components in grid frequency associated with noise or phase jumps.

In another embodiment, multiple dynamic power change limit components may be combined together to form a total dynamic power change limit component. For example, dynamic power change limit components associated with an inertial component of power and a phase jump component may be summed together.

In another embodiment, a maximum component limit and a minimum component limit may define a maximum and minimum allowable grid-induced power deviations associated certain component of power before the controls begin to limit the component. For example, an allowable grid-induced power deviation associated with a phase jump component of power may be +0.3 pu and −0.3 pu. Therefore, in such embodiments, for grid phase jumps that cause power deviations within the +0.3 pu and −0.3 pu range, the dynamic power change limit of the power component limiter is zero. However, for grid phase jumps that cause power to change by an amount exceeding the allowable range, the dynamic power change limit will be non-zero and act to move the power limits in a direction that opposes the grid-induced power deviation.

In another embodiment, a maximum component limit and minimum component limit may be different for different components of power. Additionally, the maximum component limit and minimum component limit may change dynamically with operating conditions of the inverter-based resource. For example, in an embodiment, the operating condition(s) may include a rotor speed, a generator speed, torque, power output, or pitch angle. In certain embodiments, the maximum component limit may be lower when a wind-turbine generator is operating at low speed to avoid grid-induced power increases causing under speed trips Referring now to FIG. 12, a control diagram of an embodiment of a system 300 for providing grid-forming control of an inverter-based resource according to the present disclosure is illustrated. In particular, as shown, the system 300 receives a power reference signal 302 (Pref0). Further, as shown, the system 300 may include summators 304, 306, that receive positive and negative power margins 308, 310 (PrefMrg, −PrefMrg), respectively. In an embodiment, the positive and negative power margins 308, 310 may be fixed values that can be selected to prevent noise in the power change limit signal from unintentionally causing changes in the final power reference limits.

Figure 12:
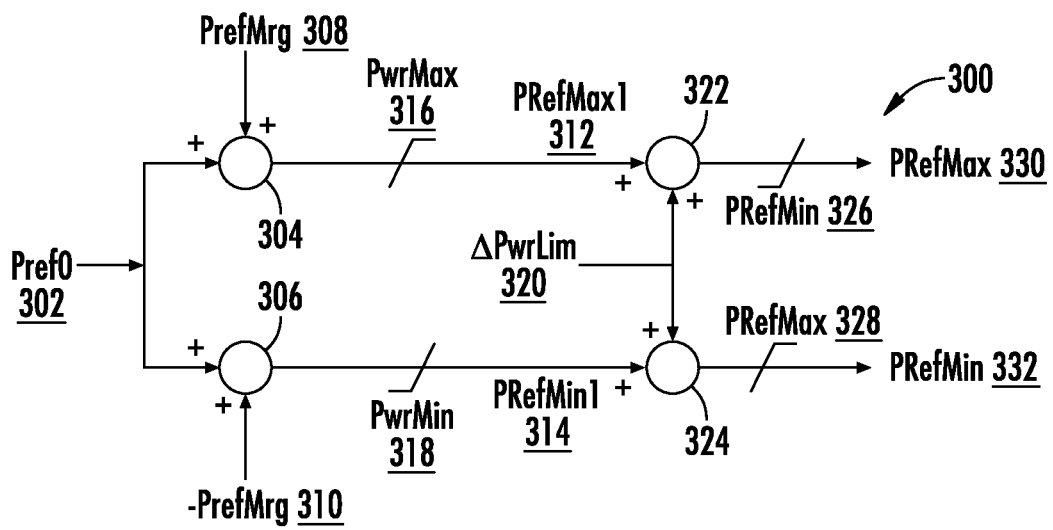
FIG. 12 illustrates a control diagram of one embodiment of a system for providing grid-forming control of an inverter-based resource according to the present disclosure.

Accordingly, as shown in FIG. 12, the summators 304, 306 are configured to combine the power command 302 and the positive and negative power margins 308, 310, respectively, to generate upper and lower boundaries 312, 314 (PRefMax1, PRefMin1). In addition, as shown, the system 300 is configured to apply maximum and minimum power limits 316, 318 (PwrMax, PwrMin) to the upper and lower boundaries 312, 314 to restrict the upper and lower boundaries 312, 314 to equipment limits on power.

In addition, as shown, the system 300 may receive the dynamic power change limit 320 (from FIG. 11) via summators 322, 324 for determining limits 330, 332 (PRefMax, PRefMin) for an inertial power regulator reference based on the upper and lower boundaries 312, 314. Moreover, as shown, the system 300 may also include minimum and maximum power reference limits 326, 328 applied to the limits 330, 332 (PRefMax, PRefMin).

Figure 13:
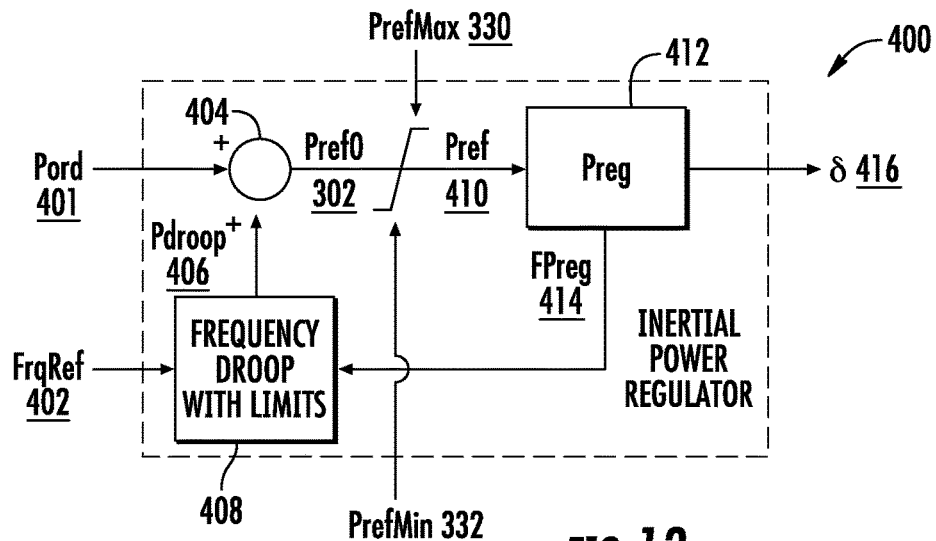
FIG. 13 illustrates a control diagram of one embodiment of an inertial power regulator of a system for providing grid-forming control of an inverter-based resource according to the present disclosure.

Accordingly, as shown in FIG. 13, the inertial-power regulator limits 330, 332 (PRefMax, PRefMin) can be applied to the inertial power regulator reference(s) 410 (Pref) in the inertial power regulator 400. More specifically, as shown, the inertial power regulator 400 is configured to receive a power command 401 (Pord) from a higher-level controller, such as the farm-level controller 156, via a summator 404 and a frequency reference 402 (FrqRef) via a frequency droop module 408 with limits. Thus, as shown, the summator 404 generates the power reference signal 302 (Pref0) as a function of the external power command 401 and a droop signal 406 (Pdroop) from the frequency droop module 408. Further, as shown, the power reference signal 302 can have the limits 330, 332 (PRefMax, PRefMin) applied thereto. As illustrated, for example, the droop signal 406 may be generated by the frequency droop module 408 as a function of the frequency reference 402 and a power regulator signal 414 (FPreg). The limited value (i.e., power reference 410 (Pref)) can thus be received by a power regulator 412 that generates a phase angle signal 416 (δ) for the power converter 106 and/or the power regulator signal 414 as a function of the power reference 410. Further, as shown, the power regulator signal 414 may be used by the frequency droop module 408 to generate the droop signal 406.

Figure 14:
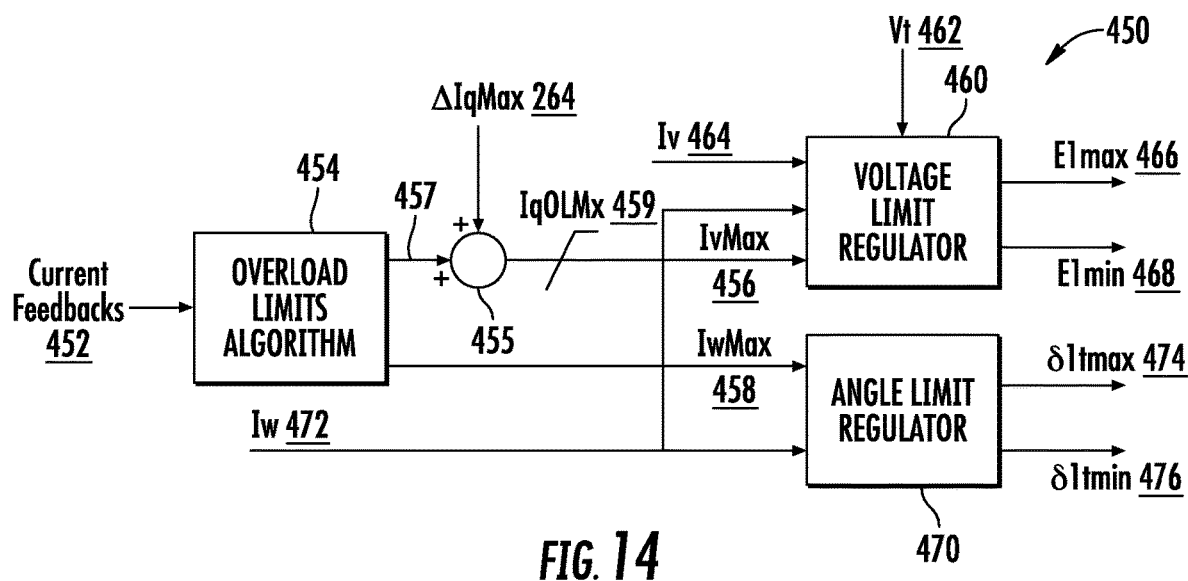
FIG. 14 illustrates a simplified functional block diagram illustrating generation of limit values for use in the system for providing grid-forming control of an inverter-based resource according to the present disclosure.

Referring now to FIG. 14, a simplified functional block diagram 450 illustrating generation of limit values (such as voltage and angle limits) for use in the system for providing grid-forming control of an inverter-based resource according to the present disclosure is illustrated. In particular, as shown, currents feedbacks 452 may be applied to an overload limit algorithm block 454 which performs the calculations to derive the values IVmax 456 and IWmax 458. Further, as shown, the diagram 450 may also include a summator 455 for summing a reactive current limit output 457 from the overload limit algorithm 454 and the reactive current limit 264 (ΔIqMax) (from FIG. 11). Thus, simultaneous with constraining the change in power, the change in the reactive current limit 264 may be changed in such a way to increase voltage support to prevent voltage collapse in weak grids if the grid is causing excessive power injection from the resource. Moreover, as shown, an additional reactive current limit 459 (IqOLMx) may be applied to the output of the summator 455 to determine IvMAx 456, while also preventing the total reactive current from exceeding the total current capability of the system/equipment limits.

Furthermore, as shown, IVmax 456 is applied to a voltage limit regulator 460 which also receives the measured terminal voltage VT 462, measured battery voltage EDCf, real component of current IW and reactive component of current IV 464. The voltage limit regulator 460 uses these values to calculate the values EImax 466 and EImin 468. Similarly, the angle limit regulator block 470 receives the values of IWmax 458 and IW 472 and uses those values to calculate the angle limits δImax 474 and δImin 476.

Accordingly, the system and method of the present disclosure constrains the change in power from the desired operating point of the grid forming inverter-based resource due to grid frequency/phase events. Further, the system and method of the present disclosure constrains certain components of power, not just the total power injected by the resource, which is different from conventional power limits that normally constrain total power to respect equipment limits or grid constraints/boundaries.

Further aspects of the invention are provided by the subject matter of the following clauses:

Clause 1. A method for providing grid-forming control of an inverter-based resource connected to an electrical grid, the method comprising:
  receiving, via a controller, a power reference signal;
  determining, via the controller, an upper power boundary and a lower power boundary based on the power reference signal;
  determining, via the controller, a dynamic power change limit for grid-induced power deviations from a desired power operating point;
  determining, via the controller, limits for an inertial power regulator reference based, at least in part, on the upper and lower power boundaries and the dynamic power change limit; and applying, via the controller, the limits to the inertial power regulator reference in an inertial power regulator of the inverter-based resource.

Clause 2. The method of clause 1, further comprising:
  receiving, via the controller, a positive power margin and a negative power margin; and
  determining, via the controller, the upper and lower power boundaries for the grid-induced power deviations from the desired power operating point based on the power reference signal and the positive and negative power margins.

Clause 3. The method of any of the preceding clauses, further comprising determining, via the controller, the power reference signal as a function of a power command received from an external controller and a frequency droop signal.

Clause 4. The method of any of the preceding clauses, further comprising estimating a change in a power component of the inverter-based resource as a function of one or more grid feedbacks, the power component associated with at least one of a grid phase jump or a grid frequency drift.

Clause 5. The method of clause 4, wherein the one or more grid feedbacks comprise at least one of phase angle, frequency, voltage, current, or combinations thereof.

Clause 6. The method of clauses 4-5, further comprising determining the dynamic power change limit and a dynamic reactive current change limit based on a comparison of the change in the power component and maximum and minimum power component limits.

Clause 7. The method of clause 6, further comprising:
  receiving, via the controller, one or more current feedbacks from the electrical grid;
  determining, via the controller, a reactive current limit output based on the one or more current feedbacks; and
  determining a total reactive current limit as a function of the reactive current limit output and the dynamic reactive current change limit.

Clause 8. The method of clause 7, further comprising applying, via the controller, an additional reactive current limit to the total reactive current limit to prevent the total reactive current from exceeding a total current capability of the inverter-based resource.

Clause 9. The method of clause 2, further comprising determining the upper power boundary and the lower power boundary for the positive and negative power margins from the desired operating point based on the power reference signal and the positive and negative power margins, while also restricting boundaries to equipment limits of the inverter-based resource.

Clause 10. The method of any of the preceding clauses, wherein the inverter-based resource comprises at least one of a wind turbine power system, a solar power system, an energy storage power system, or combinations thereof.

Clause 11. The method of clause 10, wherein the controller comprises at least one of a turbine controller or a converter controller of the wind turbine power system.

Clause 12. A converter controller for providing grid-forming control of an inverter-based resource connected to an electrical grid, the converter controller comprising:
  at least one controller comprising at least one processor, the at least one processor configured to perform a plurality of operations, the plurality of operations comprising:
    receiving a power reference signal;
    determining a dynamic power change limit;
    determining an upper power boundary and a lower power boundary for grid-induced power deviations from a desired power operating point based, at least in part, on the power reference signal;
    determining limits for an inertial power regulator reference based, at least in part, on the upper and lower power boundaries and dynamic power change limit; and
  applying the limits to the inertial power regulator reference in an inertial power regulator of the inverter-based resource.

Clause 13. The converter controller of clause 12, wherein the plurality of operations further comprise:
  determining the power reference signal as a function of a power command received from an external controller and a frequency droop signal;
  receiving a positive power margin and a negative power margin; and
  determining the upper and lower power boundaries for the grid-induced power deviations from the desired power operating point based on the power reference signal and the positive and negative power margins.

Clause 14. The converter controller of clauses 12-13, wherein the plurality of operations further comprise:
estimating a change in a power component of the inverter-based resource as a function of one or more grid feedbacks, the power component associated with at least one of a grid phase jump or a grid frequency drift.

Clause 15. The converter controller of clause 14, wherein the one or more grid feedbacks comprise at least one of phase angle, frequency, voltage, current, or combinations thereof.

Clause 16. The converter controller of clause 14, wherein the plurality of operations further comprise:
estimating a dynamic power change limit and a dynamic reactive current change limit based on a comparison of the change in the power component and maximum and minimum power component limits.

Clause 17. The converter controller of clause 16, wherein the plurality of operations further comprise:
receiving one or more current feedbacks from the electrical grid;
determining a reactive current limit output based on the one or more current feedbacks; and
determining a total reactive current limit as a function of the reactive current limit output and the dynamic reactive current change limit.

Clause 18. The converter controller of clause 17, wherein the plurality of operations further comprise:
applying an additional reactive current limit to the total reactive current limit to prevent the total reactive current from exceeding a total current capability of the inverter-based resource.

Clause 19. The converter controller of clause 13, wherein the plurality of operations further comprise:
determining the upper power boundary and the lower power boundary for the positive and negative power margins from the desired operating point based on the power reference signal and the positive and negative power margins, while also restricting boundaries to equipment limits of the inverter-based resource.

Clause 20. The converter controller of clauses 12-19, wherein the inverter-based resource comprises at least one of a wind turbine power system, a solar power system, an energy storage power system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing grid-forming control of an inverter-based resource connected to an electrical grid, the method comprising:
receiving, via a controller, a power reference signal;
determining, via the controller, an upper power boundary and a lower power boundary based on the power reference signal;
determining, via the controller, a dynamic power change limit for grid-induced power deviations from a desired power operating point;
determining, via the controller, limits for an inertial power regulator reference based, at least in part, on the upper and lower power boundaries and the dynamic power change limit; and
applying, via the controller, the limits to the inertial power regulator reference in an inertial power regulator of the inverter-based resource,
wherein determining, via the controller, the dynamic power change limit further comprises:
estimating a change in a power component of the inverter-based resource as a function of one or more grid feedbacks, the power component associated with at least one of a grid phase jump or a grid frequency drift; and
determining the dynamic power change limit based on a comparison of the change in the power component and maximum and minimum power component limits.

2. The method of claim 1, further comprising:
receiving, via the controller, a positive power margin and a negative power margin; and
determining, via the controller, the upper and lower power boundaries for the grid-induced power deviations from the desired power operating point based on the power reference signal and the positive and negative power margins.

3. The method of claim 1, further comprising determining, via the controller, the power reference signal as a function of a power command received from an external controller and a frequency droop signal.

4. The method of claim 1, wherein the one or more grid feedbacks comprise at least one of phase angle, frequency, voltage, current, or combinations thereof.

5. The method of claim 1, further comprising determining a dynamic reactive current change limit based on the comparison of the change in the power component and the maximum and minimum power component limits.

6. The method of claim 5, further comprising:
receiving, via the controller, one or more current feedbacks from the electrical grid;
determining, via the controller, a reactive current limit output based on the one or more current feedbacks; and
determining a total reactive current limit as a function of the reactive current limit output and the dynamic reactive current change limit.

7. The method of claim 6, further comprising applying, via the controller, an additional reactive current limit to the total reactive current limit to prevent the total reactive current from exceeding a total current capability of the inverter-based resource.

8. The method of claim 2, further comprising determining the upper power boundary and the lower power boundary for the positive and negative power margins from the desired operating point based on the power reference signal and the positive and negative power margins, while also restricting the upper and lower power boundaries to the limits for the inertial power regulator of the inverter-based resource.

9. The method of claim 1, wherein the inverter-based resource comprises at least one of a wind turbine power system, a solar power system, an energy storage power system, or combinations thereof.

10. The method of claim 9, wherein the controller comprises at least one of a turbine controller or a converter controller of the wind turbine power system.

11. A converter controller for providing grid-forming control of an inverter-based resource connected to an electrical grid, the converter controller comprising:

at least one controller comprising at least one processor, the at least one processor configured to perform a plurality of operations, the plurality of operations comprising:
receiving a power reference signal;
determining a dynamic power change limit;
determining an upper power boundary and a lower power boundary for grid-induced power deviations from a desired power operating point based, at least in part, on the power reference signal;
determining limits for an inertial power regulator reference based, at least in part, on the upper and lower power boundaries and dynamic power change limit; and
applying the limits to the inertial power regulator reference in an inertial power regulator of the inverter-based resource,
wherein determining the dynamic power change limit further comprises:
estimating a change in a power component of the inverter-based resource as a function of one or more grid feedbacks, the power component associated with at least one of a grid phase jump or a grid frequency drift; and
estimating the dynamic power change limit based on a comparison of the change in the power component and maximum and minimum power component limits.

12. The converter controller of claim 11, wherein the plurality of operations further comprise:
determining the power reference signal as a function of a power command received from an external controller and a frequency droop signal;
receiving a positive power margin and a negative power margin; and
determining the upper and lower power boundaries for the grid-induced power deviations from the desired power operating point based on the power reference signal and the positive and negative power margins.

13. The converter controller of claim 11, wherein the one or more grid feedbacks comprise at least one of phase angle, frequency, voltage, current, or combinations thereof.

14. The converter controller of claim 11, wherein the plurality of operations further comprise:
estimating a dynamic reactive current change limit based on the comparison of the change in the power component and the maximum and minimum power component limits.

15. The converter controller of claim 14, wherein the plurality of operations further comprise:
receiving one or more current feedbacks from the electrical grid;
determining a reactive current limit output based on the one or more current feedbacks; and
determining a total reactive current limit as a function of the reactive current limit output and the dynamic reactive current change limit.

16. The converter controller of claim 15, wherein the plurality of operations further comprise:
applying an additional reactive current limit to the total reactive current limit to prevent the total reactive current from exceeding a total current capability of the inverter-based resource.

17. The converter controller of claim 12, wherein the plurality of operations further comprise:
determining the upper power boundary and the lower power boundary for the positive and negative power margins from the desired operating point based on the power reference signal and the positive and negative power margins, while also restricting the upper and lower power boundaries to the limits for the inertial power regulator of the inverter-based resource.

18. The converter controller of claim 11, wherein the inverter-based resource comprises at least one of a wind turbine power system, a solar power system, an energy storage power system, or combinations thereof.

* * * * *